(No Model.)
G. HOEPFNER & H. WUEST.
SUBSIDIARY AXLE ARM.
No. 357,828. Patented Feb. 15, 1887.
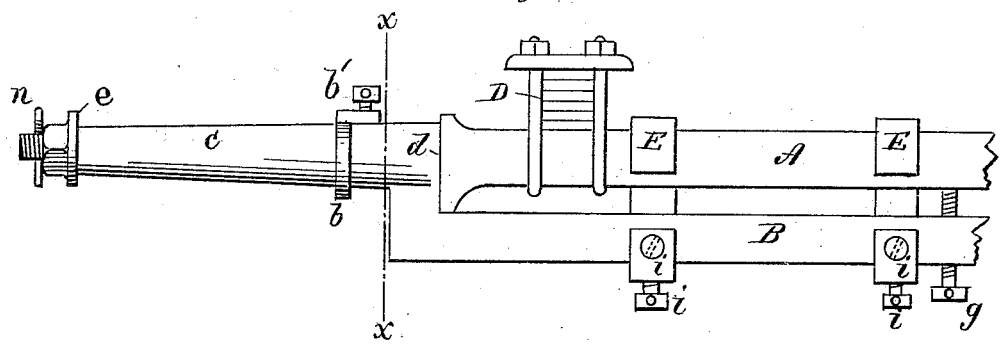
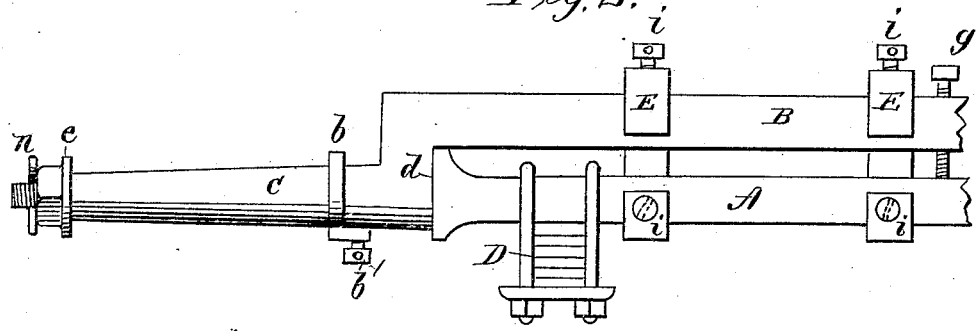
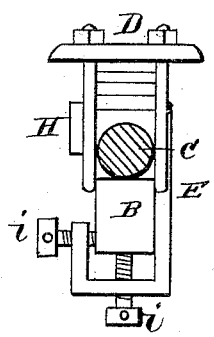
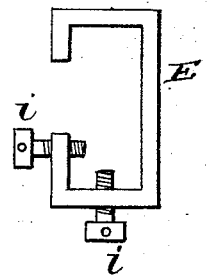
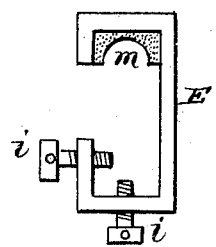
WITNESSES:
INVENTOR:
G. Hoepfner
H. Wuest
BY
ATTORNEYS.

UNITED STATES PATENT OFFICE.

GEORGE HOEPFNER AND HENRY WUEST, OF NEW YORK, N. Y.

SUBSIDIARY AXLE-ARM.

SPECIFICATION forming part of Letters Patent No. 357,828, dated February 15, 1887.

Application filed June 29, 1886. Serial No. 206,609. (No model.)

*To all whom it may concern:*

Be it known that we, GEORGE HOEPFNER and HENRY WUEST, of the city, county, and State of New York, have invented a new and Improved Subsidiary Axle-Arm, of which the following is a full, clear, and exact description.

Our invention relates to subsidiary axle-arms, and has for its object to devise a safe and expeditious means of attaching an axle-arm to the end of the axle of a vehicle in event the original arm thereof becomes broken off.

It consists in the construction of an axle-body having a subsidiary axle-arm integral therewith, forming at their point of juncture a right angle and attaching the same to the main axle of a vehicle by clamps, the subsidiary axle-arm being susceptible of use upon either end of the main axle and adapted to be secured either above or below the same; also, in the details of construction of the axle and clamps, as will be hereinafter fully set forth.

Reference is to be had to the accompanying drawings, forming a part of this specification, in which similar letters of reference indicate corresponding parts in all the figures.

Figure 1 is a side elevation of our subsidiary axle-arm clamped to the main axle of a vehicle, with the axle-body below the same. Fig. 2 is also a side elevation of the subsidiary axle-arm clamped to the main axle, the reverse of Fig. 1. Fig. 3 is a vertical section through line *x x* of Fig. 1. Fig. 4 is a side elevation of one of the clamps, and Fig. 5 a side elevation of a clamp with rubber packing therein.

A represents the main axle of a vehicle from which the axle-arm has been broken off, B the body of the subsidiary axle, and C the axle-arm. The axle-arm C and its body B, which is integral therewith, constitute a right angle at their juncture, so that the flat end of the axle-arm C forms a rectangular shoulder, *d*, which abuts against the end of the broken main axle A, bringing the said subsidiary axle-arm in line therewith.

In vehicles constructed with the spring D clipped over the main axle A, the subsidiary axle-arm C, when needed, is clamped by its body B under the main axle, as seen in Fig. 1, and when the spring is clipped under the said main axle the said body carrying the said axle-arm is clamped above the same, as shown in Fig. 2.

A collar-washer, *b*, secured upon the subsidiary axle-arm C by a set screw, *b'*, is adjustable upon said axle-arm, to accommodate different length hubs, the hub of the wheel belonging to the broken main axle being brought close between the collar-nut *e* and the said collar-washer *b*, insuring a safe and easy revolution thereof.

The axle-arm C and body B are held in position, the one against the broken end of the main axle A and the other under or over the same, as found necessary, by means of clamps E, formed of a bar bent four times at a right angle, as shown. These clamps are provided with set-screws *i i*, the one passing through the end and the other through the corresponding short side thereof, as shown in Fig. 4; or they may be placed as shown in Fig. 2, one in the end and the other in the short side of the opposite end, or elsewhere, as may be found necessary; or three or more may be employed, if desired. These clamps E embrace both the main axle A and the body B of subsidiary axle-arm C, holding them firmly and securely together by means of the set-screws *i i*, and are made long and wide enough to take in any size axle.

If that portion of the axle-arm between the collars should curve or rest upon spring-clips, a set-screw, *g*, passing through the end of the body B, is brought into operation to regulate the position of the axle-arm C, keeping it at all times in line with the main axle A.

To utilize the same clamps upon an axle provided with a wooden axle-bed, a piece of hard rubber, *m*, curved centrally, is placed in the clamps, as shown in Fig. 5, between it and the wooden axle-bed. This prevents the clamps, when drawn down solid to their places, marring the paint thereon. The same subsidiary axle arm and body can be used upon either the right or left side of the main axle A, as the linchpin *n* passed through the end of the axle-arm C, outside the collar-nut *e* and bearing against it, prevents the said nut from unscrewing when the hub revolves against it with the thread.

The various heads of the set-screws employed in my device are round, having holes drilled through them for the passage of a steel bar, by which they are operated. I sometimes, however, make set-screws with a wheel-head milled upon the periphery.

A subsidiary axle may conveniently be carried in any vehicle, as it requires but little room and is not very weighty; or it may be suspended, if necessary, beneath the flooring thereof.

As my invention obviates the trouble, labor, and time of propping up a broken carriage or wagon axle on the road or at a place distant from a shop, its convenience and usefulness are beyond question. The said subsidiary axle can be readily attached, when occasion requires, in a short space of time and by any person possessing ordinary intelligence.

The operation is as follows: When the axle-arm of a vehicle is broken off, the rectangular shoulder $d$ of my subsidiary axle is placed against the collar of the main axle, with the body B either over or under the same, as the position of the spring-clips thereon may necessitate. The clamps E are then temporarily secured to admit of the alignment of the subsidiary axle by means of the adjusting-screw $g$, to bring the axle-arm C true with the main axle. The set-screws in the clamps are then tightened up, thereby clamping the subsidiary axle firmly to the main axle. Should the axle be embedded in wood, the rubber packing is intervened between the clamp and the axle. The wheel is then slid over the axle-arm C, the collar-nut screwed on, and the linchpin passed through the end of the said axle-arm outside the nut. The adjustable collar-washer is then moved upon the axle-arm, so as to bear against the inside of the hub, and by means of its set-screw secured in place. The vehicle is now once more in running order.

Having thus fully described our invention, we claim as new and desire to secure by Letters Patent—

1. In a reversible subsidiary axle, the combination, with the main axle of a vehicle, of the axle-arm C, having the rectangular shoulder $d$, and the body B, provided with the adjusting-screw $g$, said body adapted to be clamped to said main axle by the clamps E, having set-screws $i\,i$, substantially in the manner and for the purpose herein set forth.

2. In a reversible subsidiary axle, the combination, with the main axle of a vehicle, of the axle-arm C, provided with an adjustable collar-washer, $b$, collar-nut $e$, linchpin $n$, and rectangular shoulder $d$, and the body B, integral therewith, secured to the main axle by the clamps E E, substantially in the manner and for the purpose herein set forth.

3. In a subsidiary axle, the combination, with the main axle of a vehicle, of the axle-arm C, having rectangular shoulder $d$, and body B integral therewith, and secured to the main axle by clamps E E, provided with a rubber packing, $m$, to protect the axle, substantially in the manner and for the purpose herein set forth.

GEORGE HOEPFNER.
HENRY WUEST.

Witnesses:
H. HORNICKEL,
W. BRAASCH, Jr.